United States Patent [19]
Cater

[11] Patent Number: 5,046,644
[45] Date of Patent: Sep. 10, 1991

[54] ATOMIZING FLUID DISPENSER ONE

[75] Inventor: Miro S. Cater, Newtown, Conn.

[73] Assignee: American Dispensing Systems Inc., Marlboro, N.J.

[21] Appl. No.: 441,761

[22] Filed: Nov. 27, 1989

[51] Int. Cl.⁵ .............................................. G01F 11/06
[52] U.S. Cl. .................................... 222/321; 222/341; 222/385
[58] Field of Search ............... 222/321, 341, 383, 385, 222/400.5, 401, 402.1, 402.2; 239/333; 417/544

[56] References Cited

U.S. PATENT DOCUMENTS

| | | | |
|---|---|---|---|
| 4,025,046 | 5/1977 | Boris | 239/333 |
| 4,051,983 | 10/1977 | Anderson | 222/321 |
| 4,089,442 | 5/1978 | Hafele | 222/385 |
| 4,274,560 | 6/1981 | Cater | 222/321 |
| 4,389,003 | 6/1983 | Meshberg | 222/321 |
| 4,606,479 | 8/1986 | Van Brocklin | 222/321 |
| 4,692,103 | 9/1987 | Anderson | 417/547 |
| 4,735,347 | 6/1988 | Schultz | 222/321 |

FOREIGN PATENT DOCUMENTS

2821486 11/1979 Fed. Rep. of Germany ...... 239/333

Primary Examiner—Michael S. Huppert
Assistant Examiner—Philippe Derakshani

[57] ABSTRACT

An atomizing dispenser employs a vertical hollow elongated body with upper and lower ends and an orifice centered on the body axis and disposed between the upper and lower body ends. A hollow sleeve is disposed within the body with a relatively large open lower end and a relatively small open upper end and is vertically slidable. A vertically movable member has a lower enlarged section disposed within the sleeve and an upper section extending through the upper end of the sleeve. A vertically movable hollow piston has upper and lower open ends. The upper section of the member extends through the lower end of the piston into the piston interior; the lower end of the piston slidably engaging the inner surface of the upper body end. A pump chamber defined by a hollow region bounded by adjacent portions of the body, piston, member and sleeve is normally filled with fluid and is sealed at first and second ports to prevent fluid from leaking out of the chamber when the piston, member and sleeve are in fully raised positions. The first port allows fluid to enter the chamber when the member is raised while engaging the piston; the second port allows fluid to be discharged from the chamber when the member is lowered and is disengaged from the piston.

13 Claims, 8 Drawing Sheets

ATOMIZING FLUID DISPENSER ONE

CROSS REFERENCE TO COPENDING APPLICATION

The present application is related to copending application entitled "ATOMIZING FLUID DISPENSER TWO", Ser. No. 441,893, filed on even date hereof, and owned by the assignee of the present application.

BACKGROUND OF THE INVENTION

The present invention relates to atomizing dispensers which are adapted to be secured to containers filled with fluids and which are manually operated to dispense such fluids. Typically such dispensers have actuators which are normally in raised position and which are manually depressed in order to initiate the discharge of a quantity of fluid from a container. When the manual pressure is removed, the actuators are automatically returned to the normal raised position. Known dispensers must be primed from time to time in order to expel entrapped air which interferes with the proper discharge of fluid.

The present invention is directed toward atomizing dispensers which overcome these difficulties. More particularly, the present invention is directed toward atomizing dispensers which once initially primed do not require additional priming operations. The invention overcomes these difficulties through the use of a novel valving system which enables compressible air or other media to be discharged while at the same time avoiding loss of fluid or inaccuracies in delivery rates.

SUMMARY OF THE INVENTION

An atomizing dispenser for dispensing fluid from a container of this fluid in accordance with the principles of this invention employs a vertical hollow elongated body having a vertical axis and upper and lower ends. The body has an opening centered on the body axis and disposed between the upper and lower ends.

A hollow sleeve has an axis coincident with the body axis and is disposed within the body. The sleeve is vertically slidable up and down along the axis and has a relatively large open lower end and a relatively small open upper end.

A vertical member having an axis coincident with the body axis is vertically movable along its axis between fully raised and fully lowered positions. The member has a lower enlarged section disposed within the sleeve and an upper section extending upwardly through the upper end of the sleeve.

Spring means is disposed within the body to bear against the lower body end and against the lower section of the valve. The spring means has fully extended and fully compressed positions.

A hollow piston has upper and lower open ends and has an axis coincident with the body axis. The upper section of the member extends through the lower end of the piston into the hollow interior of the piston. The lower end of the piston slidably engages the inner surface of the open upper end of the body. The piston is vertically movable along its axis.

A pump chamber is defined by a hollow region bounded by adjacent portions of the body, piston, member and sleeve. The chamber cooperates with these adjacent portions to establish a first chamber port for fluid entry and a second chamber port for fluid discharge. The chamber, after the dispenser is primed, is normally filled with fluid and is sealed at both ports to prevent fluid from leaking out of the chamber when the piston, member and sleeve are in fully raised positions. The first port is at least partially unsealed to allow fluid to enter the chamber when the member is being raised from fully lowered to fully raised position and the member and piston are engaged. The second port is at least partially unsealed to allow fluid to be discharged from the chamber when the member is being lowered from fully raised to fully lowered position and the member is disengaged from the piston.

Actuator means is provided with a discharge orifice and has an axis coincident with the body axis. The actuator means is disposed above and engages the piston in a normal fully raised position at which the member, sleeve and piston are in fully raised positions, both chamber ports are sealed and the spring means is in fully extended position. The actuator means, when subjected to downward pressure, establishes and hydraulic force which moves the piston, member and sleeve downwardly, with the piston and member being disengaged, thereby producing a spray discharge of fluid through the orifice until the piston and member are engaged in fully lowered positions and the spring means is in fully compressed position. The spring means, when the downward pressure on the actuator means is released, automatically returns to its fully extended position, thereby returning the actuator means to its normal raised position.

As will be explained in more detail hereinafter, after the dispenser is connected to the container, the dispenser need only be primed once. Thereafter the chamber is automatically filled with fluid and is sealed so that the fluid will not leak out either to the atmosphere or back into the container. When the actuator is depressed, the fluid in the chamber will be forced out as a discharge through the orifice. When the actuator is released, the spring means returns the actuator to its original position and at the same time fluid is drawn into the chamber to fill it and the chamber is then sealed automatically.

DETAILED DESCRIPTION OF PREFERRED EMBODIMENTS

As shown in FIGS. 1-14, an atomizing dispenser for dispensing fluid from a container of such fluid utilizes a vertical hollow elongated body 32 having a vertical axis and upper and lower ends.

Figure 1:
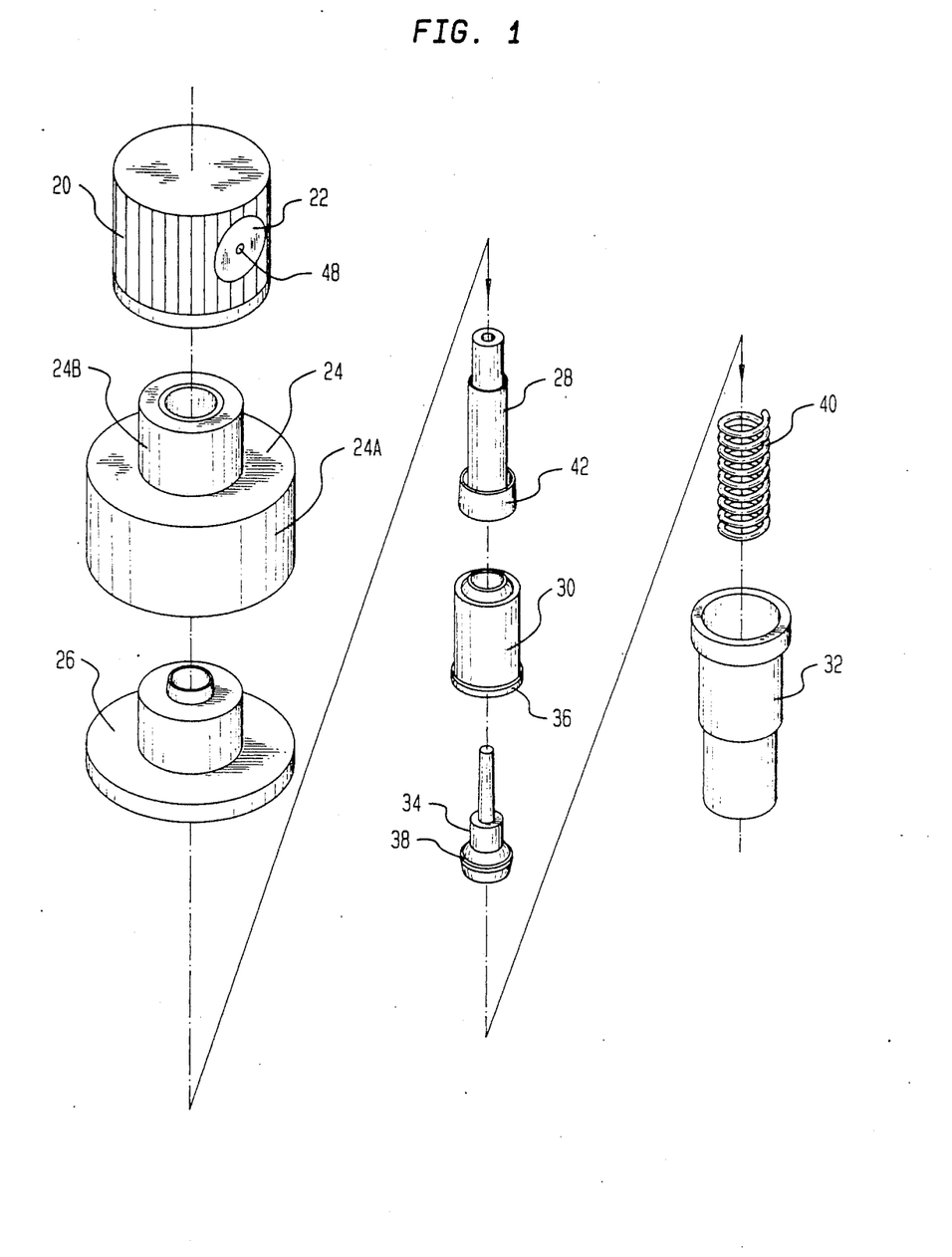
FIG. 1 is an exploded view of a preferred embodiment of the invention.
Figures 2, 3:
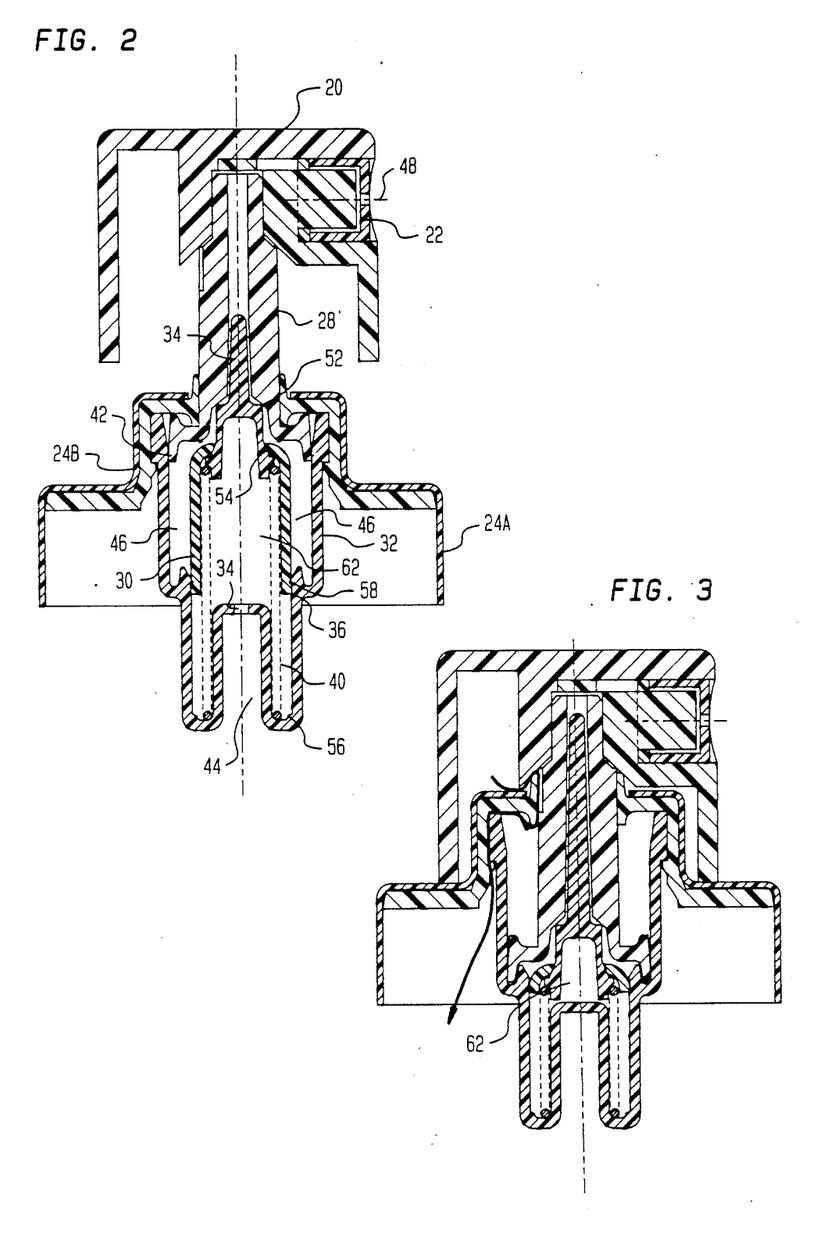
FIG. 2 is a vertical cross sectional assembled view of the structure of FIG. 1 shown in rest position.
FIG. 3 is a view similar to FIG. 2 but showing the embodiment at the completion of the down stroke.

The body has an opening 34 which is centered on the body axis and is disposed between the upper and lower ends. Thus, the body has a cylindrical hollow recess 44 with an axis coincident with the body axis and extending from the lower end to the opening. In normal use, a dip tube is disposed removably in the recess with one open end abutting opening 34 and the opposite open end extending into the bottom of a container via an open neck to make contact with fluid therein. The upper end of the body forms part of the upper section of the body which takes the form of a hollow cylinder. The lower end of the body forms part of the lower section of the body which takes the form of two concentric hollow cylinders joined together at the lower end. These two concentric cylinders in horizontal cross section define a hollow annular structure. At the point at which the upper and lower sections merge, the cylinder of the upper section curves inwardly to merge with the outer of the two concentric cylinders and form therewith a circular ring shaped groove 58.

A hollow sleeve 30 has an axis coincident with the body axis and is disposed within the body. The sleeve is vertically slidable up and down along the axis. It has a relatively large open lower end and a relatively small open upper end. It has a lower peripheral skirt 36.

A vertical member 34 has an axis coincident with the body axis and is vertically movable along its axis between fully raised and fully lowered positions shown in FIGS. 2 and 3 respectively. The member has a lower enlarged section disposed within the sleeve and an upper pointed section extending upwardly through the upper end of the sleeve. The member also has a peripheral circular bead 38 disposed around the lower section. The member can be solid or hollow, its function being the same in either case.

A spring 40 has an axis coincident with the body axis and is disposed within the body to bear against the lower body end and against the lower section of the member. The spring has a fully extended position when the dispenser is in rest position and has a fully compressed position when the dispenser is positioned at the bottom of the down stroke. When the dispenser is in rest position, the spring forces the lower section of the member into locking engagement with the upper end of the sleeve.

A hollow piston 28 has upper and lower open ends and has an axis coincident with the body axis. The member has an upper extension which extends through the lower end of the piston into the hollow interior of the piston. The lower end of the piston has an outer peripheral skirt 42 which slidably engages the inner surface of the open upper end of the body. The piston is vertically movable along its axis. The lower limit of travel for the piston is set at the point at which skirt 42 engages groove 59.

A hollow collar 26 has an axis coincident with the body axis and has a larger open lower end and a smaller open upper end, the upper end of the body extending through the lower end of the collar and abutting the upper end of the collar. The piston extends slidably through the upper end of the collar.

A pump chamber 46 is formed by a hollow region bounded by adjacent portions of the body, piston, member and sleeve. This region in horizontal cross section has the general shape of a ring or other annular structure. As viewed in vertical cross section, the structure has an outer wall adjacent the body which is of generally cylindrical shape and an inner wall adjacent the sleeve which is also of generally cylindrical shape, the radius of the outer wall being larger than the radius of the inner wall.

The chamber cooperates with the adjacent portions of the body, member, piston and sleeve to form a first chamber port 54 for fluid entry and a second chamber port 52 for fluid discharge. The chamber, after the dispenser is primed, is normally filled with fluid and is sealed at both ports to prevent fluid from leaking out of the chamber when the member and sleeve are in fully raised positions.

The first port 54 is at least partially unsealed to allow fluid to enter the chamber when the member is being raised from fully lowered to fully raised position and the member and piston are engaged. The second port 52 is at least partially unsealed to allow fluid to be discharged from the chamber when the member is being lowered from fully raised to fully lowered position and the member is disengaged from the piston.

A mounting cup 24 has an axis coincident with the body axis. It takes the form of a lower hollow cylinder 24A having an open bottom end which is surmounted by an upper hollow cylinder 24B of smaller radius and having an upper end with a circular opening. Cylinder 24B has an open lower end engaging the upper closed end of cylinder 24A. This closed end has a circular opening aligned with the opening in the upper end of cylinder 24B. The collar 26 is fitted within the cup. When the dispenser is in rest position, the piston extends upwardly through the collar and cup. When the dispenser is in use, the cup engages the top of the open neck of a vertically disposed container filled with imcompressible fluid.

An actuator 20 having the general shape of an inverted hollow cup and is provided with a side mounted insert 22 having a fluid discharge orifice 48. The actuator has an axis coincident with the body axis. The actuator is disposed above and engages the top end of the piston while being aligned with and disposed above cylinder 24B in a normal fully raised position at which the member, sleeve and piston are in fully raised positions, both chamber ports are sealed and the spring means is in fully extended position.

The actuator, when subjected to downward pressure, is moved into engagement with the cylinder 24B, establishing a force which moves the piston, member and sleeve downwardly with the piston and member disengaged, thereby producing a spray discharge of fluid through the orifice, until the piston and member are engaged in fully lowered positions and the spring is in fully compressed position. The spring, when the downward pressure on the actuator is released, automatically returns to its fully extended position, thereby returning the actuator to its normal raised position.

The operation of the dispenser will first be described on the assumption that the dispenser has been primed previously and the chamber is filled with incompressible fluid The priming operation will be described thereafter.

DISPENSER OPERATION SUBSEQUENT TO PRIMING

Figure 14:
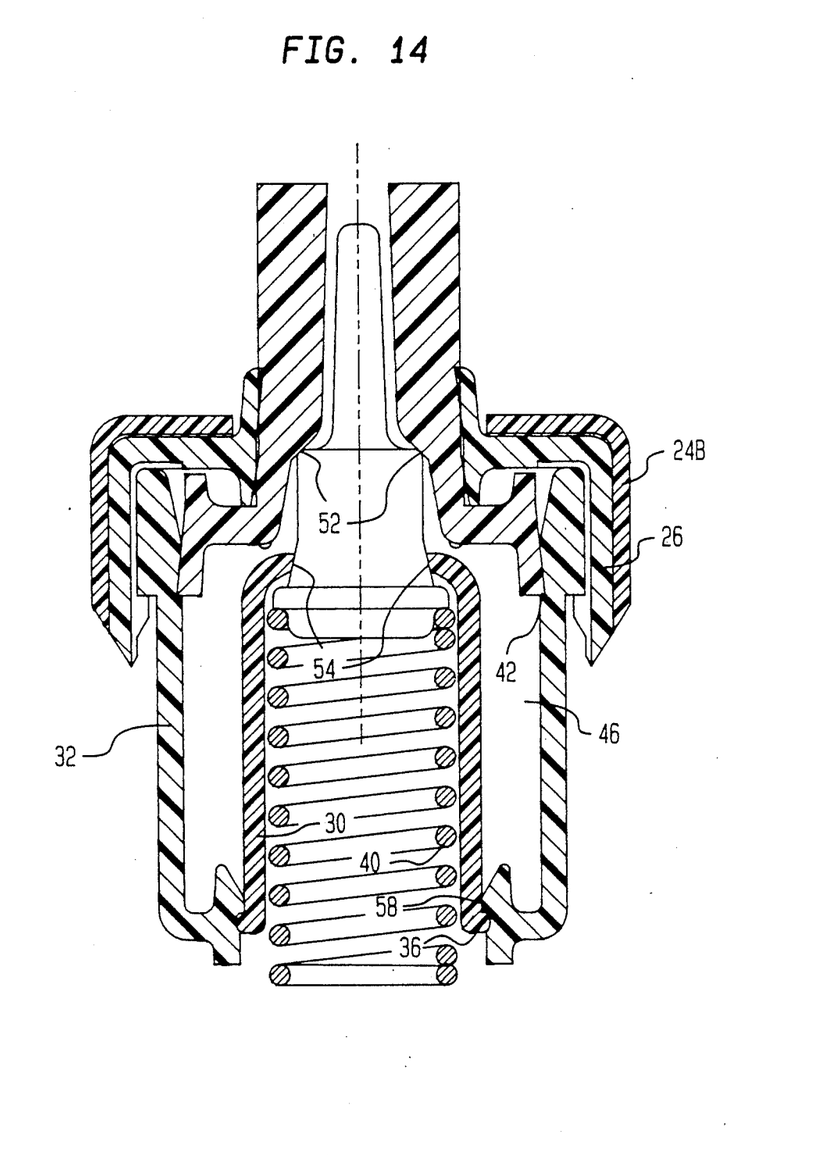
FIG. 14 is an enlarged detail view of the structure shown in FIG. 2.

As shown in FIGS. 2 and 14, the piston and sleeve skirts 42 and 36 seal against the body 32. The upper end of the chamber 46 has a second port 52 which is closed because the spring 40 biases the member 34 against the piston. Opening 34 which communicates via a dip tube to the fluid in the container is sealed off at a first port 54 between the member and the sleeve which is closed since the sleeve is held biased against the member because skirt 36 engages circular bead 58 on the body. Thus, the chamber, filled with fluid, is completely sealed, both ports being closed, preventing leakage when the dispenser is at rest.

Figures 8, 9:
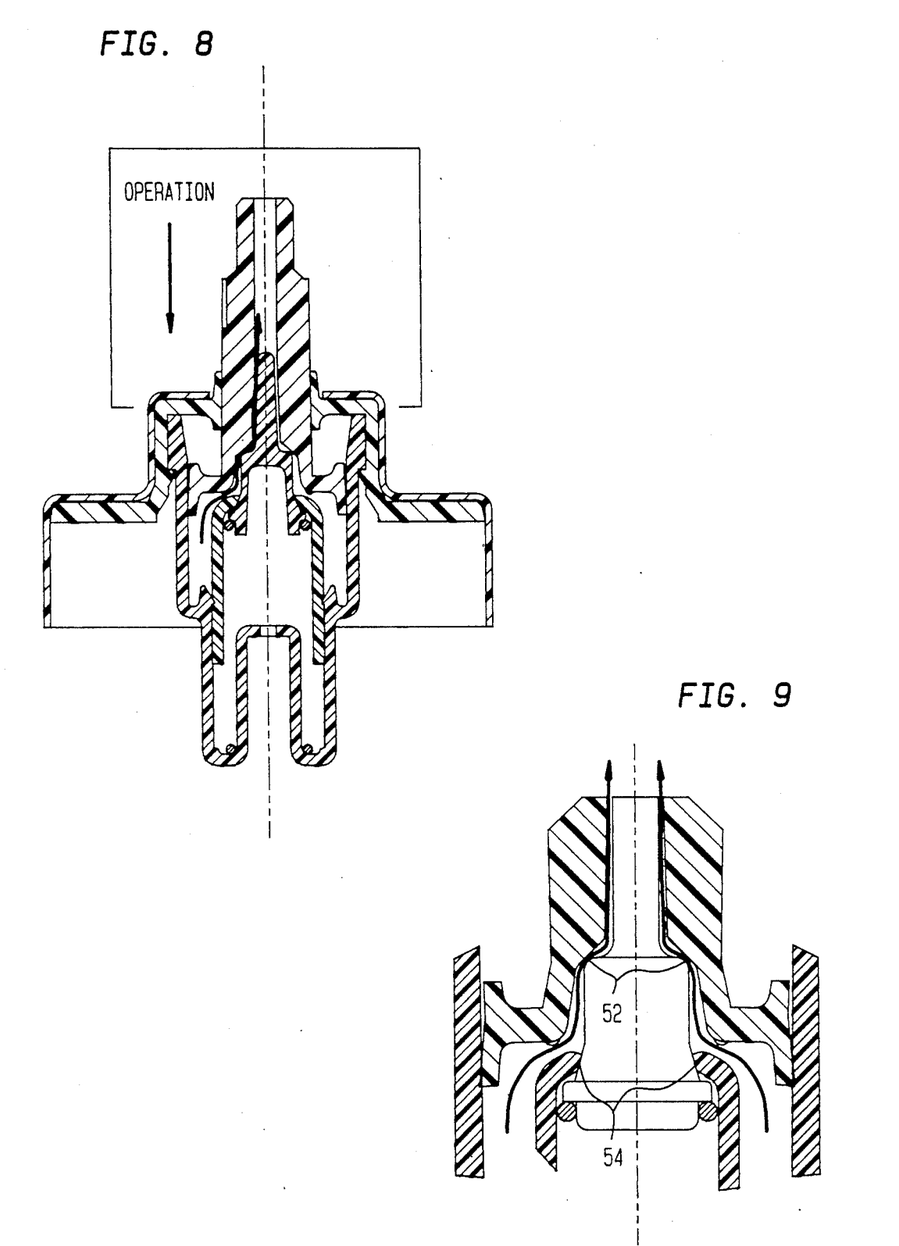
FIG. 8 is a cross sectional view illustrating a partially completed down stroke used in discharging fluid after a priming operation has been completed.
FIG. 9 is an enlarged detail view of a portion of the structure shown in FIG. 8.

Referring now to FIGS. 3, 8, 9 and 12, during the downstroke, the piston, member and sleeve move together, reducing the volume in the main pump chamber 46. The fluid contained within the chamber creates forces on surrounding surfaces proportional to their areas. Since the port 54 is maintained closed in rest position and the entire chamber is filled with incompressible fluid, the pressure buildup is instantaneous. The force which acts against the sleeve reinforces the coupling of sleeve and member closing port 54. When the total force acting of the area of the sleeve which is exposed to the pump chamber 46 exceeds the opposite force of the spring, the sleeve and member move downward together away from the piston, opening the port 52. The pump then sprays, thus dispensing the fluid as shown in FIGS. 8 and 9.

At the bottom of the downstroke, the sleeve skirt 36 reaches the ledge 56. The dispensing action continues until the piston engages the member, closing port 52. When there is no air in the chamber, the pressure in the chamber increases sharply, preventing further downward movement of the piston. At this point the port 54 remains closed. The amount of fluid dispensed will be accurately maintained at a constant value, being a function of the piston and sleeve diameters and the length of stroke between the bead 58 and the ledge 56.

Figure 13:
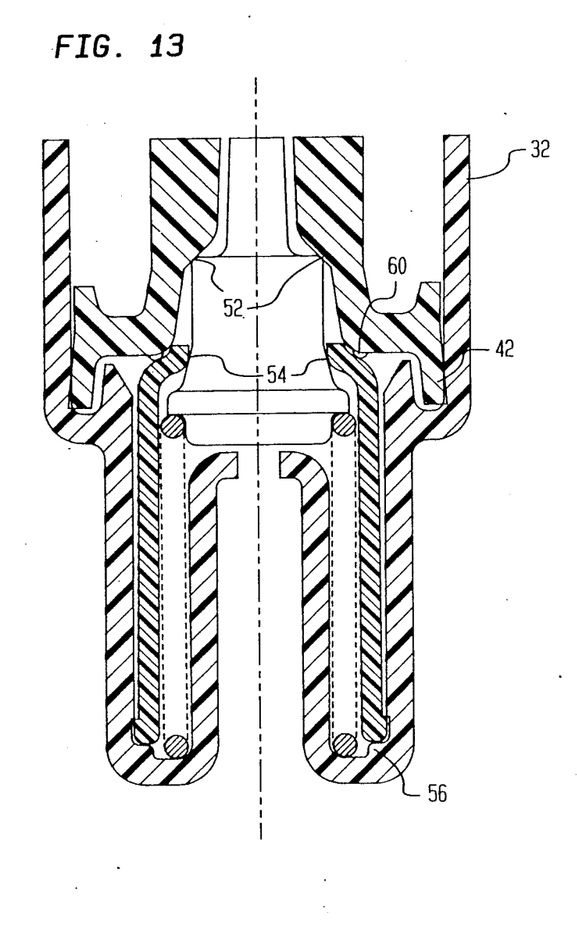
FIG. 13 is an enlarged detail view of another portion of the structure shown in FIG. 10.

However, if there is some air trapped in the chamber, as is the case during the initial priming, the pressure in the chamber does not increase to a value at which the movement of the piston is arrested. Instead, the member and piston will continue to move downward a small additional distance to open the seal 54, and the air escapes therethrough out of the chamber as shown in FIG. 13.

Figure 10:
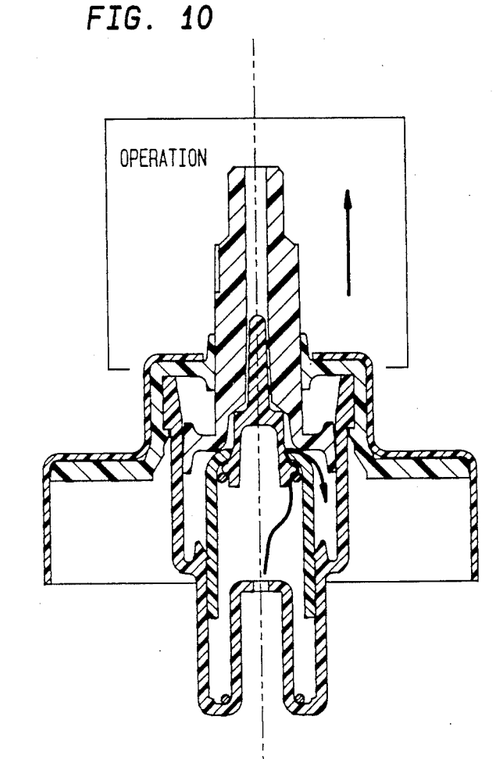
FIG. 10 is a cross sectional view illustrating a partially completed up stroke used in charging the structure with fluid after the down stroke of FIG. 6 has been completed.
Figure 11:
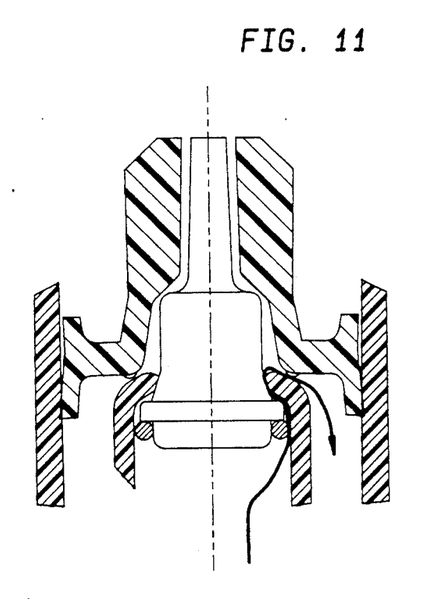
FIG. 11 is an enlarged detail view of a portion of the structure shown in FIG. 10.
Figure 12:
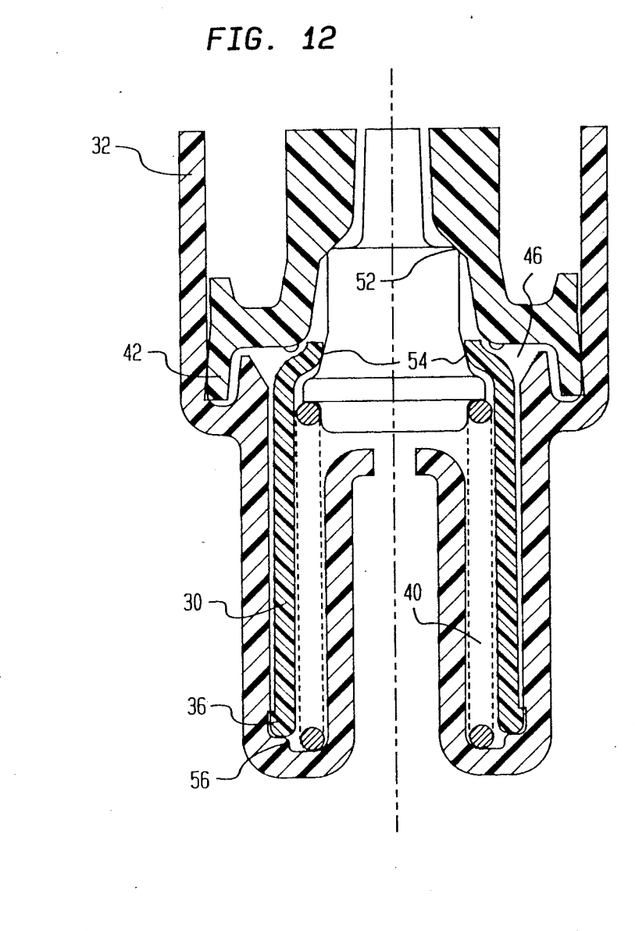
FIG. 12 is an enlarged detail view of another portion of the structure shown in FIG. 8.

Once the downward pressure on the actuator has been released, the spring expands. The volume of the chamber, which has been reduced to a minimum at the completion of the downstroke, begins to increase. As the fluid cannot be expanded, the negative pressure [suction] within the chamber creates an upward force onto the area of the sleeve which is exposed to the pump chamber, exerting a force which opens port 54 in any event. As shown in FIGS. 10 and 11, suction force thus pulls fluid up through the dip tube and opening 34, through the open port 54 and into the chamber. Ports 52 and 54 return to sealed position at the top of the return stroke.

DISPENSER PRIMING OPERATION

The dispenser priming operation is illustrated in FIGS. 4-7 and FIG. 13. Initially, the chamber 46 contains air which is compressible. During the downward stroke, the pressure within the chamber increases proportionally with the reduction in volume of the air contained in the chamber. The increase is insignificant at the start of the downstroke and it is unable to overcome the friction which exists between the sleeve skirt 36 and the body. Sleeve 30 then remains stationary while the piston and member move downward, opening port 54.

Figures 4, 5:
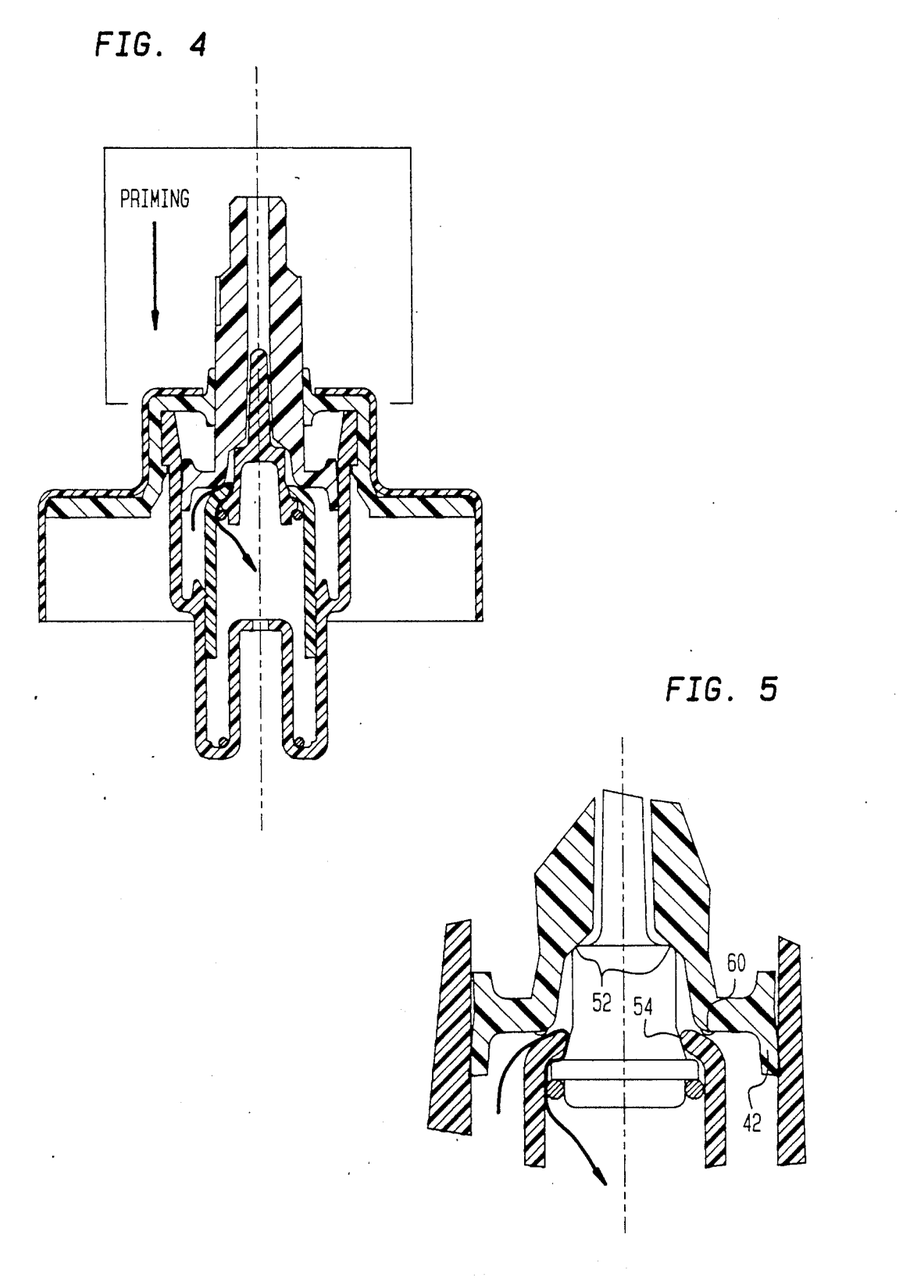
FIG. 4 is a cross sectional view illustrating a partially completed down stroke during a priming operation.
FIG. 5 is an enlarged detail view of the structure of FIG. 4.

Once the piston touches the sleeve with protrusions 60 [FIG. 5], the piston, sleeve and member travel downward together and air is forced out of the chamber downwardly through opening 34.

Figure 6:
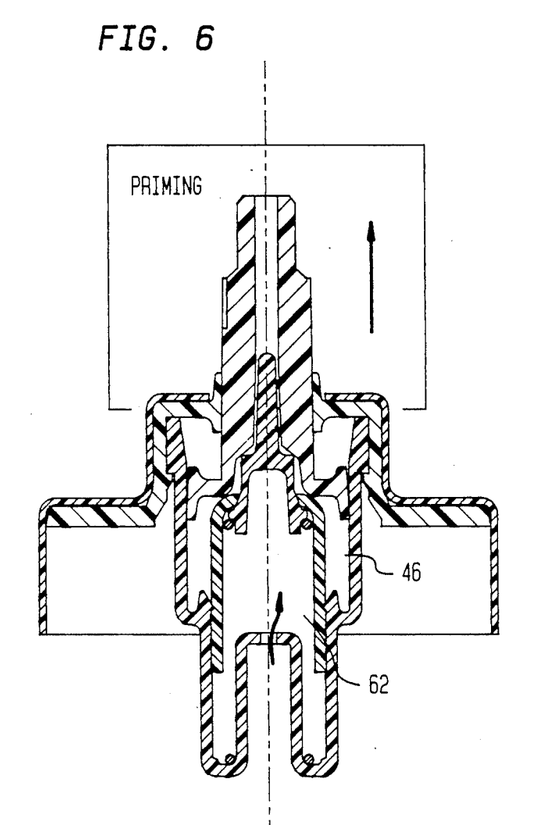
FIG. 6 is a cross sectional view illustrating a partially completed up stroke during a priming operation after the down stroke of FIG. 4 has been completed.
Figure 7:
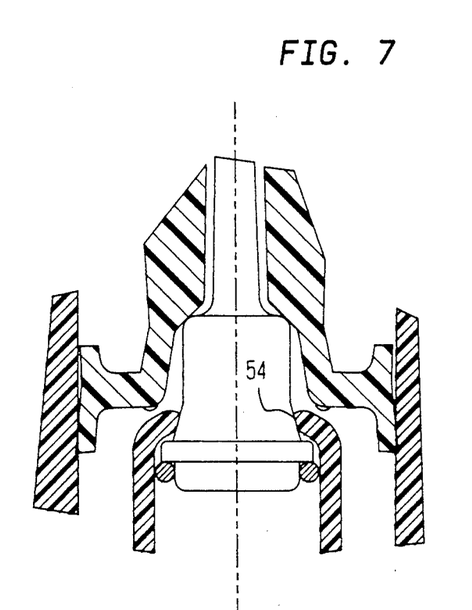
FIG. 7 is an enlarged detail view of the structure of FIG. 6.

During the return stroke, friction between the sleeve skirt 36 and the body will partially close port 54. Since the volume defined by the body and beneath the sleeve is increasing, a suction force is produced which draws fluid upwardly through orifice 34 into the chamber. At the same time, the volume in the pump chamber is also increasing, creating a suction within which is proportional to the expanded volume as compared to the minimal volume at the start of the return stroke. The suction within the chamber creates an upward force on the sleeve. That force exceeds the frictional forces between the skirt 36 and the body at some point during the return stroke, opening port 54. When the chamber has reached its maximum volume, port 54 is again fully closed because the upward motion of the steeve is arrested by bead 58. Almost 95% of the entrapped air can be expelled in this manner from the chamber during the first stroke. This result is obtained because the percentage of expulsion is dependent upon the ratio of the maximum chamber volume at the beginning of the down stroke to the minimum chamber volume at the end of the downstroke.

The dispenser will function properly in any position. Under certain circumstances, as for example when the dispenser is inverted and placed below the container, a dip tube is not needed.

What is claimed is:

1. An atomizing dispenser for dispensing incompressible fluid from a container of this fluid, the dispenser comprising:
    a vertical hollow elongated body having a vertical axis, an open upper end and a lower end, the body having an opening centered on the body axis and disposed between the upper and lower ends;
    a hollow sleeve having an axis coincident with the body axis and disposed within the body, the sleeve being vertically slidable up and down along the axis, the sleeve having a relatively large open lower end and a relatively small open upper end;
    a vertical member having an axis coincident with the body axis and being vertically movable along its axis both between fully raised and fully lowered positions and with respect to the sleeve, the member having a lower enlarged section disposed within the sleeve and an upper section extending upwardly through the upper end of the sleeve;
    spring means disposed within the body to bear against the lower body end and against the lower section of the member, the spring means having fully extended and fully compressed positions;

a hollow piston having upper and lower open ends and having an axis coincident with the body axis, the upper section of the member extending through the lower end of the piston into the hollow interior of the piston, the lower end of the piston slidably engaging the inner surface of the open upper end of the body, the piston being vertically movable along its axis;

a pump chamber defined by a hollow region bounded by adjacent portions of the body, member, piston and sleeve, the chamber cooperating with said adjacent portions to establish a first chamber port for fluid entry and a second chamber port for fluid discharge, the chamber, after the dispenser is primed, being normally filled with fluid and sealed at both ports to prevent fluid from leaking out of the chamber when the piston, member and sleeve are in fully raised positions, the first port being at least partially unsealed to allow fluid to enter the chamber when the member is being raised from fully lowered to fully raised position and the member and the piston are engaged, the second port being at least partially unsealed to allow fluid to be discharged from the chamber when the member is being lowered from fully raised to fully lowered position and the member is disengaged from the piston; and actuator means provided with a fluid discharge orifice and having an axis coincident with the body axis, the actuator means being disposed above and engaging the piston in a normal fully raised position at which the member, sleeve and piston are in fully raised positions, both chamber ports are sealed and the spring means is in fully extended position, the actuator means, when subjected to downward pressure, establishing a force which moves the piston, member and sleeve downwardly with the piston and member being disengaged, thereby producing a spray discharge of fluid through the orifice, until the piston and member are engaged in fully lowered positions and the spring means is in fully compressed position, the spring means, when the downward pressure on the actuator means is released, automatically returning to its fully extended position, thereby returning the actuator means to its normal raised position.

2. The dispenser of claim 1 wherein the actuator means includes an inverted hollow actuator cup having a side mounted actuator insert with a discharge orifice therein.

3. The dispenser of claim 2 wherein the actuator means includes a mounting cup disposed below the actuator cup.

4. The dispenser of claim 3 wherein the actuator means includes a collar disposed within the mounting cup.

5. The dispenser of claim 4 wherein the body has a lower section defined by two concentric outer and inner spaced apart hollow cylinders joined at the lower end, the inner section having a horizontal circular ledge disposed in the inner wall of the outer cylinder adjacent but above the lower end.

6. The dispenser of claim 1 wherein the sleeve has an outwardly extending peripheral sleeve disposed at its lower end.

7. The dispenser of claim 6 wherein the piston has an outwardly extending peripheral sleve disposed at its lower end.

8. The dispenser of claim 7 wherein the member has an outwardly extending circular bead disposed at its lower end.

9. The dispenser of claim 8 wherein the body has an upper section constituting a hollow cylinder having a larger diameter than either of the two concentric hollow outer and inner cylinders, the lower end of the hollow cylinder curving inwardly to merge with the top end of the outer cylinder and forming therewith a circular groove.

10. The dispenser of claim 9 wherein the skirt of the piston engages the circular groove when the piston has reached its lowest position.

11. The dispenser of claim 1 wherein the second port is formed between the member and the piston, the second port being opened when member and piston are separated and being closed when member and piston are engaged.

12. The dispenser of claim 1 wherein the first port is formed between the member and the sleeve, the first port being opened when member and sleeve are separated and being closed when member and piston are engaged.

13. An atomizing dispenser for dispensing incompressible fluid from a container of this fluid, the dispenser comprising:

a vertical hollow elongated body having a vertical axis, an open upper end and a lower end, the body having an opening centered on the body axis and disposed between the upper and lower ends;

a hollow sleeve having an axis coincident with the body axis and disposed within the body, the sleeve being vertically slidable up and down along the axis, the sleeve having a relatively large open lower end and a relatively small open upper end;

a vertical member having an axis coincident with the body axis and being vertically movable along its axis both between fully raised and fully lowered positions and with respect to the sleeve, the member having a lower enlarged section disposed within the sleeve and an upper section extending upwardly through the upper end of the sleeve;

spring means disposed within the body to bear against the lower body end and against the lower section of the member, the spring means having fully extended and fully compressed positions;

a hollow piston having upper and lower open ends and having an axis coincident with the body axis, the upper section of the member extending through the lower end of the piston into the hollow interior of the piston, the lower end of the piston slidably engaging the inner surface of the open upper end of the body, the piston being vertically movable along its axis;

a pump chamber defined by a hollow region bounded by adjacent portions of the body, member, piston and sleeve, the chamber cooperating with said adjacent portions to establish a first chamber port for fluid entry and a second chamber port for fluid discharge, the first port being formed between the sleeve and the member, the first port being opened when the sleeve and member are separated and being closed when the sleeve and member are engaged, the second port being formed between the piston and the member, the second port being opened when the piston and member are separated and being closed when the piston and the member are engaged, the chamber, after the dispenser is primed, being normally filled with fluid and sealed at both ports to prevent fluid from leaking out of the chamber when the piston, member and sleeve are in fully raised positions, the first port being at least partially unsealed to allow fluid to enter the chamber when the member is being raised from fully lowered to fully raised position and the member and the piston are engaged, the second port being at least partially unsealed to allow fluid to be discharged from the chamber when the member is being lowered from fully raised to fully lowered position and the member is disengaged from the piston; and actuator means provided with a fluid discharge orifice and having an axis coincident with the body axis, the actuator means being disposed above and engaging the piston in a normal fully raised position at which the member, sleeve and piston are in fully raised positions, both chamber ports are sealed and the spring means is in fully extended position, the actuator means, when subjected to downward pressure, establishing a force which moves the piston, member and sleeve downwardly with the piston and member being disengaged, thereby producing a spray discharge of fluid through the orifice, until the piston and member are engaged in fully lowered positions and the spring means is in fully compressed position, the spring means, when the downward pressure on the actuator means is released, automatically returning to its fully extended position, thereby returning the actuator means to its normal raised position.

\* \* \* \* \*